June 20, 1972     C. D. RICHARDSON     3,671,210
METHOD AND APPARATUS FOR FIBERIZING MOLTEN MINERAL MATERIALS
Filed Sept. 15, 1969     4 Sheets-Sheet 4
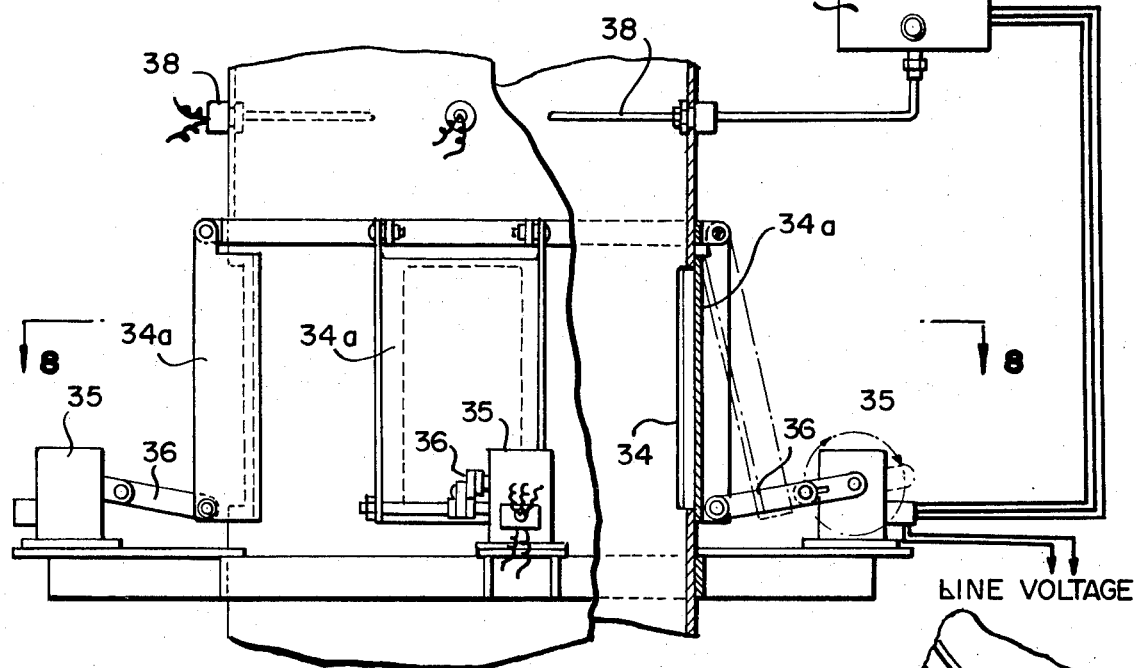
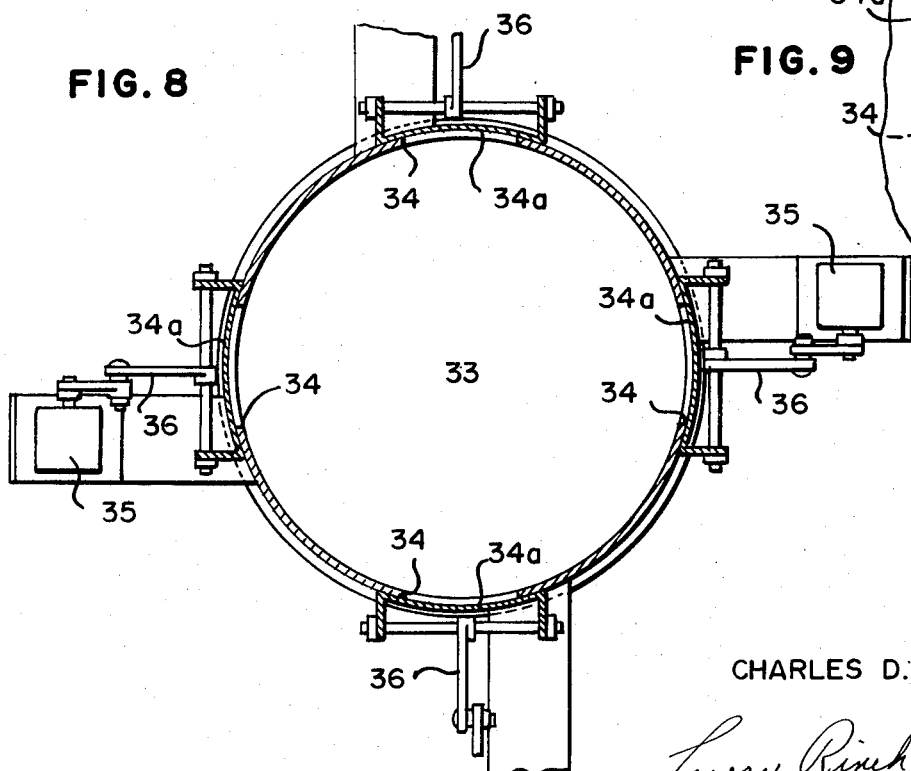
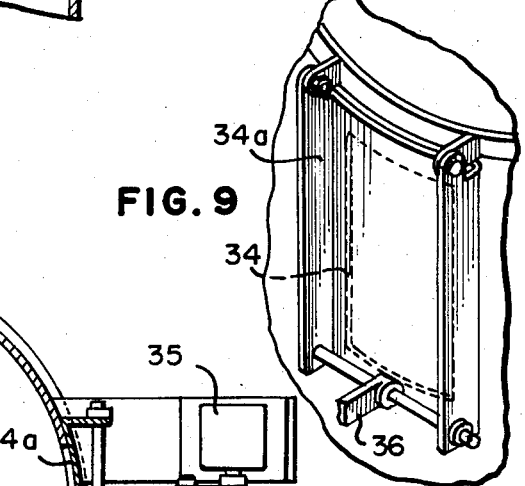
INVENTOR
CHARLES D. RICHARDSON
BY Lowry, Rinehart & Markva
ATTORNEYS

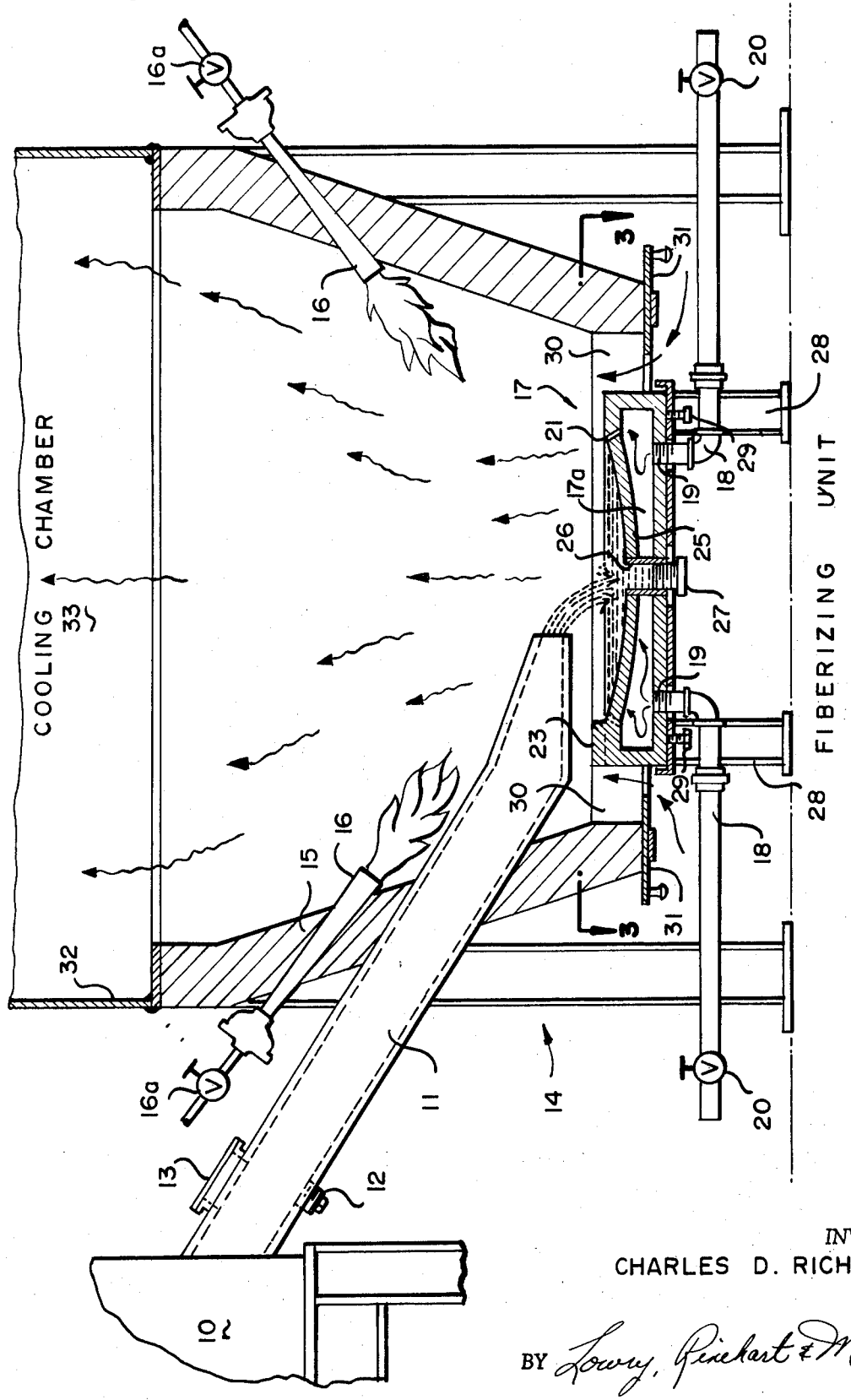

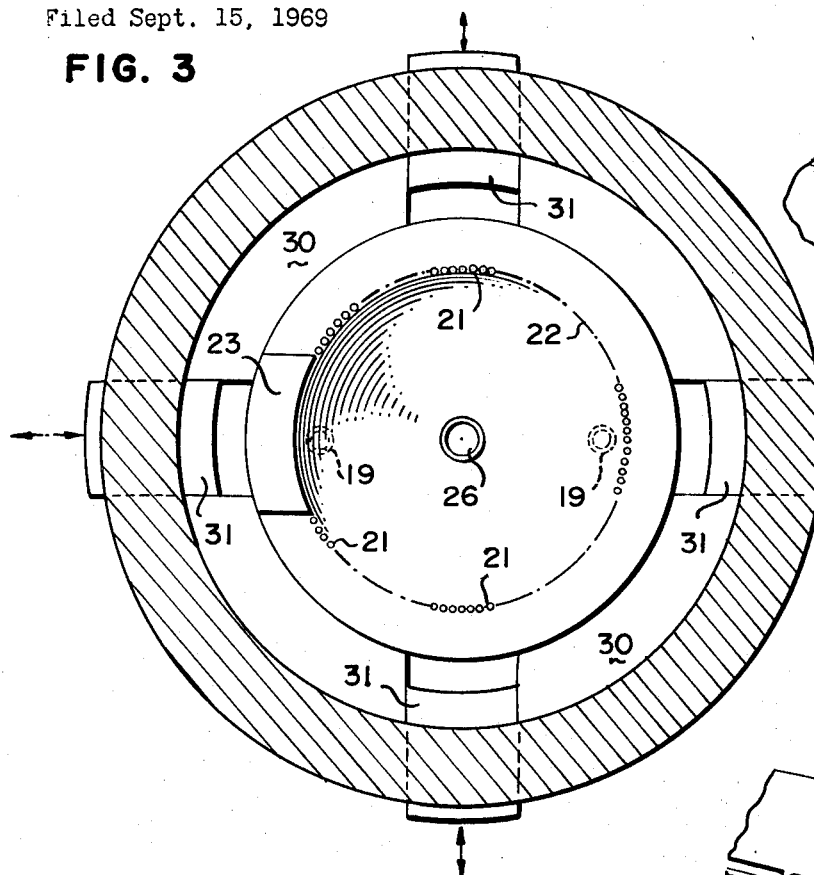
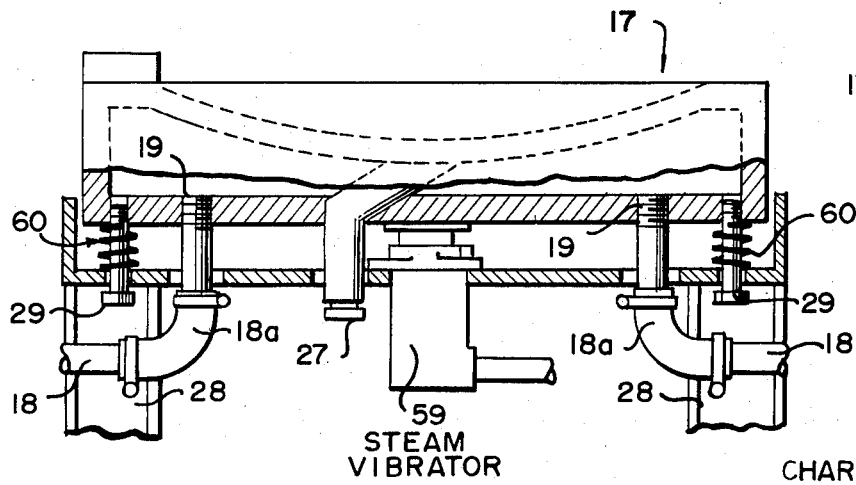

United States Patent Office 3,671,210
Patented June 20, 1972

3,671,210
METHOD AND APPARATUS FOR FIBERIZING MOLTEN MINERAL MATERIALS
Charles D. Richardson, Muncie, Ind., assignor to Richardson Service, Inc., Muncie, Ind.
Filed Sept. 15, 1969, Ser. No. 857,847
Int. Cl. C03b 37/06
U.S. Cl. 65—5
21 Claims

ABSTRACT OF THE DISCLOSURE

This disclosure provides a method and apparatus for converting molten material such as slag, glass, rock or the like into fibers. A featheredge of molten material is provided in conjunction with a supply bath. A featheredge, by definition, is a section that is made as thin as possible. A pressurized flow of fluid medium is directed along the featheredge to cause the molten material to be forcefully transported as streamers into the area directly above the supply bath. Nozzle openings are provided along the featheredge to direct a pressurized flow of fluid medium into the featheredge of molten material. An assembly is provided in which a fiberizing vessel is fixedly mounted at the bottom of a vertically extending housing which forms a fiberizing chamber. A controlled atmosphere is established in the fiberizing chamber for obtaining the desired structural characteristics in the solidified fibers formed therein. The fiberizing chamber is operatively connected to a settling chamber in which the fiber material is collected for further processing and/or discharge from the assembly.

BACKGROUND OF THE INVENTION

There are many prior art patents which are directed to various processes and apparatus assemblies for forming fibers from molten material. Such materials as slag, molten slag, glass or rock have been formed into fibrous products such as mineral wool, glass wool and rock wool. It has long been known to strike a molten stream of material with a high pressured jet of steam to form fibers therefrom. However, it is extremely difficult to obtain complete fiberization of a downward flowing stream of molten material as it runs from a melting furnace such as a cupola. Such a stream of molten material has to be very small or else the material will not be fiberized. That is, many small beads of unfiberized material such as slag will be present in the finished product. These small beads of slag are known in the industry as shot.

Another prior art method of forming slag fibers was to divide a mainstream of slag into several smaller streams. This division of the mainstream was made as the molten material ran from the cupola. As many as ten streams have been used in this prior art process. The basic disadvantage of this embodiment is that it was difficult to hold each stream to the same uniform size. This resulted in many different kinds of fiber product. The ultimate product may include a non-uniform mixture of coarse, brashy, brittle, soft, long and short fibers.

There are many other methods of forming fiber material. The most popular method to date includes the step of throwing the molten material from a revolving cup-shaped rotor. A steam ring or blasting nozzle encircles the revolving rotor and directs a fluid medium against the molten material being thrown from the rotor. This action of the fluid medium blasts the molten material into fibers. However, there are many disadvantages in this particular method of producing fibers. If the rotor is too small, it will become overloaded and the fiber material will be of an inferior quality. If the rotor is too large, the molten material will chill before it travels to the edge thereof. In this instance, the fiber material will be coarse and brittle. Because the size of the rotor is critical, the amount of fiber material produced from such an apparatus is limited.

PURPOSE OF THE INVENTION

It is a primary object of this invention to provide a method of fiberizing molten material that will produce a substantially uniform and high quality product through control of the atmospheric temperature above the supply bath of molten material.

It is another object of this invention to provide an apparatus having a vessel means which holds a supply bath of molten material which can be treated with a pressurized flow of fluid medium to form streamers of the molten material which solidify into fibers and do not form shot.

A still further object of this invention is to provide a method and an apparatus for subjecting a portion of a supply bath to a pressurized fluid medium under controlled conditions to effect the production of fiber having uniform characteristics with respect to fineness, resilience and strength.

It is a still further object of this invention to provide an apparatus which will effect unlimited production in the method of subjecting a featheredge of a supply bath to a pressurized flow of fluid medium.

It is a further object of this invention to control the temperature of the molten material within the supply bath and the atmosphere existing thereabove to effect formation of high quality fibers.

A further object of this invention is to provide an apparatus in which the fiber material can be quickly and positively cooled to room temperature immediately after being formed within a fiberizing chamber.

A still further object of this invention is to overcome the disadvantages attendant the prior art methods and apparatus known to affect the quality of fibers produced heretofore.

SUMMARY OF THE INVENTION

These objects and other advantages corresponding to the purpose of the invention are readily achieved by the method and apparatus made in accordance with this disclosure. The method of forming fiberized material in accordance with this invention includes the forming of a featheredge of molten material which is maintained in a supply bath. That is, by definition, a section is formed that is as thin as possible at the edge of the supply bath. Controlled atmospheric conditions are established above the supply bath whereby the temperature of the material is controlled throughout the fiberizing cycle. These controlled conditions affect the nature and character of the molten metal within the supply bath and provide the necessary temperature conditions thereabove to effect the formation of a good quality, highly uniform fiber material. A pressurized flow of fluid medium such as steam or air is directed into the molten material along the featheredge formed from the supply bath of molten material.

The apparatus made in accordance with this invention includes a fixedly mounted vessel located at the bottom of a vertically extending housing which forms a fiberizing chamber. The featheredge of molten material is formed along at least a portion of the side of the vessel. A fluid flow directing means includes a series of openings located at the edge portion of the vessel. The fluid medium is ejected from the openings and into the molten material of the featheredge. These jets of fluid medium carry streamers of the molten material into the controlled atmospheric conditions existing above the supply bath.

An upwardly directed draft is established within the fiberizing chamber to carry the fibers out of the fiberizing chambers.

Other specific features of the apparatus include burners located adjacent the molten material and automatically controlled dampers located over openings in the housing of the fiberizing chamber. The amount of ambient air from the surrounding atmosphere allowed to cool the atmosphere within the fiberizing chamber is controlled as a function of the temperature conditions existing therein. That is, a temperature sensing device monitors the temperature conditions within the fiberizing chamber and the dampers are then opened or closed to control the amount of entering cooling fluid mediums such as atmospheric air.

Another specific feature of the apparatus is directed to the structural characteristics of the vessel used to contain the supply bath of molten material. The vessel of the specific embodiment includes a basin portion forming a depression in which the supply bath of molten material is maintained. Directly below the basin portion is a pressurized fluid chamber in which pressurized fluid such as steam or compressed air is introduced before being ejected as a stream of liquid medium along the edge of the basin portion. A desirous advantage of this specific embodiment is that the fluid medium will pick up heat while it is in the pressurized fluid chamber. The basin portion is thereby cooled and thus has an extended service life. The heat is absorbed by the pressurized fluid medium which thereby becomes superheated. This has been found to be an extremely advantageous factor in effecting the method of this invention.

Another feature of this invention is directed to an assembly of the fiberizing chamber in combination with a settling chamber. The fiber material is carried by the upwardly directed draft into the settling chamber where it is allowed to accumulate. Fans located in co-operative relationship with the settling chamber effect the necessary draft for carrying the fiber materials from the fiberizing chamber into the settling chamber. A more specific feature of this embodiment includes the introduction of binder material with the fibers as they are drawn into the settling chamber. Compression rolls are provided at a discharge outlet to compress the fiber product thereby forming a compacted article of manufacture.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 2 is a partial sectional view of a fiberizing chamber made in accordance with this invention, FIG. 3 is a cross-sectional view taken along line 3—3 of FIG. 2, FIG. 4 is a partial sectional view in perspective showing a specific embodiment of an apparatus made in accordance with this invention, FIG. 5 is a partial sectional view in perspective of another specific embodiment of an apparatus made in accordance with this invention, FIG. 6 is a partial sectional view showing another specific embodiment incorporating a means for vibrating the supply bath of molten material, FIG. 7 is a partial sectional view of a damper control mechanism made in accordance with this invention, FIG. 8 is a cross-sectional view of the fiberizing chamber showing the placement of dampers therearound, and FIG. 9 is a perspective view of a damper as shown in FIGS. 7 and 8.

DESCRIPTION OF SPECIFIC EMBODIMENT

Figure 1:
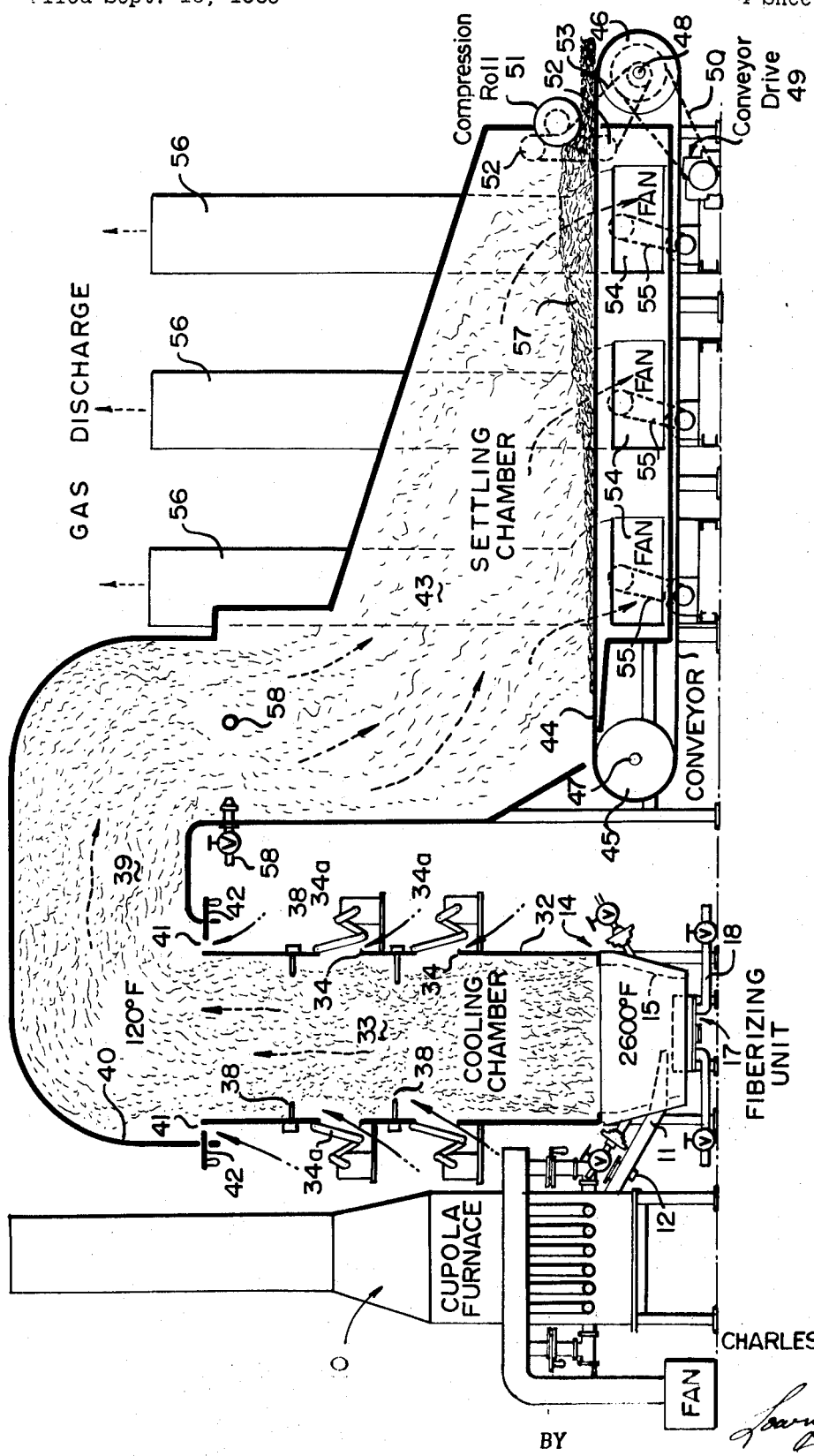
FIG. 1 is a schematic drawing of an assembly made in accordance with this invention for producing fiberized material products.

More specifically, referring to FIG. 1, molten material is produced in a melting furnace such as a cupola generally designated 10. The molten material such as slag is delivered through the trough 11 to the fiber blowing assembly 17. The closed trough 11 of this specific embodiment includes an opening 13 for visual inspection of the flowing slag. A spout plug 12 is located in the bottom of the trough 11 to allow molten slag to run to the floor instead of running to the fiber blowing unit 17 in the event of an emergency. The use of an open trough is also contemplated to be within the scope of this invention.

Once produced as discussed hereinbelow, the streamers of molten material are drawn upwardly into the cooling chamber 33 of the fiberizing unit 14 which forms the fiberizing zone. The cooled slag fibers then pass into the settling chamber 43 where accumulation takes place on the foraminous conveyor belt 44. The conveyor belt 44 moves an accumulated fiber bed 57 toward the discharge end of the assembly by way of the pulleys 45 and 46 which rotate about the shafts 47 and 48 respectively. The pulleys 47 and 48 are rotatably driven by the conveyor drive motor 49 with the conveyor chain drive 50. As the fiber bed 57 is discharged from the assembly, it is subjected to a packing pressure by the compression roll 51. The compression roll 51 is driven by the chain drive 53 which passes over the idler rolls 52.

The fans 54 driven by chain drives 55 draw air through the various openings in the housing 32 and the openings 41 located above the cooling chamber 33. As the fibers accumulate on the foraminous conveyor belt 44, the gas is exhausted through the gas discharge ducts 56 through the action of the fans 54. Where the fiberized product is a compressed article of manufacture as shown in this embodiment, a binder of resin is sprayed into the settling chamber 43 through the spray jets 58. The fibers are thereby coated with a layer of resin binder. When discharged from the settling chamber, the resin coated blanket of fibers continues on through an oven (not shown) where the binder is set or cured forming a homogeneous, rigid blanket.

The fiberizing unit 14 includes a conically shaped refractory-lined furnace portion 15. Gas burners 16 are mounted in the furnace portion 15 and controlled by the valves 16a. Although the fiberizing unit of this specific embodiment has a circular shape, other shapes may be used in this invention. For instance, the furnace portion 15 may be shaped as a frustrum of a rectangular pyramid. In this case, the housing 32 would have a rectangular shape to match it. The gas burners 16 must have sufficient capacity to control the temperature within the furnace 15 to at least 2600° F.

The fiber blowing assembly 17 includes a molten material basin 25 that has a hollow saucer shape. The blowing assembly 17 may be constructed of stainless steel or any other high temperature resisting metal or material. A fluid medium such as steam or compressed air is supplied to the blowing assembly 17 through the inlet openings 19. The supply of fluid medium is directed through the pipes 18 and controlled with the shutoff valves 20. The fluid medium is directed into the fluid pressure chamber 17a. In this specific embodiment, the steam or compressed air will pick up heat from the basin 25.

The superheated fluid medium is then ejected through the openings 21 located along the overflow line 22 at the top of the basin 25. In this specific embodiment, the basin 25 and the openings 21 are circular. The openings 21 are integrally formed in the blowing assembly 17 and interconnect with the fluid supply chamber 17a. The round openings 21 may be replaced by a slotted opening 24 shown in FIG. 5. The openings 21 or arcuate slits 24 are located along the entire periphery of the overflow line 22 except for that portion of the line 22 which is below the pouring trough 11. A raised boss 23 is also located along the top of the basin portion 25 underneath the trough 11. This structure prevents slag from overflowing since there are no holes 21 from which a pressurized fluid medium is being ejected. Absence of the holes 21 at this location prevents molten slag from being blown up against the trough 11. The circular holes 21 are spaced closely together and are very small. In this specific embodiment, the holes are 1/16" in diameter and are spaced at a distance of 1/8" from center to center. When a double row of holes 21 is located along the periphery of the overflow line 22, they are preferably in a staggered formation.

A drain opening 26 is located in the bottom of the basin portion 25. When it is necessary to drain any molten material from the basin portion 25, the drain plug 27 is removed and the molten material is allowed to flow through the drain 26.

An air space 30 surrounds the fiber blowing assembly 17 which is located at the bottom of the furnace portion 15. Air is drawn upwardly by fans 54 into the cooling chamber 33 when the control dampers 31 are open to the surrounding atmosphere. The air space 30 also provides a means for removing any molten slag or material which might have spilled over the edges of the blowing assembly 17. The control dampers 31 are manually operated in this specific embodiment. The housing 32 is composed of steel and extends vertically from the top of the refractory furnace portion 15. The housing 32 forms an enclosed atmosphere in the cooling chamber 33 in which the streamers of molten slag become solidified into uniform, high quality fibers. It is preferable that the housing 32 have a shape that corresponds to the shape of the refractory furnace portion 15. As indicated hereinabove, the respective portions of the fiberizing unit 14 may be any desired shape. Observation openings may be placed in the housing 32 to visually monitor the action taking place within the fiberizing unit 14.

The housing 32 includes a series of apertures 34 which are opened and closed automatically with the control dampers 34a. A modulating motor 35 actuates the control dampers 34a by way of the mechanical linkage 36. The temperature within the cooling chamber 33 is continuously monitored with the thermocouple 38. A temperature setting is established on the temperature control meter 37. When the temperature within the cooling chamber 33 becomes too high, the control meter 37 actautes the modulating motor 35 and the control dampers 34a are opened. Cooling air enters the chamber from the surrounding atmosphere and thereby effects cooling of the atmosphere therein. Any number of control dampers 34a may be used in the operation of the apparatus of the fiberizing unit 14. Each control damper 34a is separately metered in this specific embodiment. The fans 54 also draw the air into the system through the apertures 34 when the dampers 34a are opened. It is noted that the meter 37 also effects automatic closing of the dampers 34a when the lower temperature limit is sensed by the thermocouples 38. When this happens, the dampers 34a are automatically closed to allow a temperature increase to take place within the chamber 33.

A housing 40 located over the top of the housing 32 of the fiberizing unit 14 includes openings 41 which provide additional atmospheric air into the system when desired. Manually controlled dampers 42 determine the amount of air flow into the delivery chamber 39 in this specific embodiment. The air space of the openings 41 has an area equal to the combined area of the suction inlet to the fans 54.

In operation, the temperature controls meters 37 are set at a desired temperature level. The temperature setting for the lower openings is about 1600° F. and the temperature setting for the atmosphere in the upper part of the cooling chamber 33 is about 1000° F. Starting with a cold plant as shown in FIG. 1, any products of combustion are exhausted from the cooling chamber 33 by starting one of the fans 54 to discharge the gas through the ducts 56. All of the control dampers 34a will be closed since the meters 37 will be calling for heat. The control dampers 31 are manually closed to prevent cold air from being drawn through the fiberizing unit 14.

The gas valves 16a are then opened and the gas burners 16 are lighted. Although the burners 16 are manually controlled in this specific embodiment, it is obvious that they may be automatically controlled. The desired temperature within the refractory furnace portion 15 is in a range from about 2400° F. to 2600° F. This, of course, is a function of the type of material being fiberized. When the temperature within the cooling chamber 33 rises above the temperature settings on the control meters 37, the dampers 34a will be opened to allow cooling air to enter from the surrounding atmosphere.

As indicated, the controlled temperature conditions within the cooling chamber 33 include a temperature gradient having decreasing temperatures along the length thereof. The lower controlled cooling temperature ranges from the temperature of the atmosphere directly above the bath up to the area in the cooling chamber 33 which is maintained at about 1600° F. The temperature again decreases from the 1600° F. level to about 1000° F. as established by the control of the upper dampers 34a. It is emphasized that the specific temperatures as used in this specific embodiment are established with respect to the molten material being fiberized within the unit 14. Different types of materials require different temperature conditions. The upper and lower limits for the temperature gradient established in the fiberizing unit 14 are therefore dependent upon the material being treated. The temperature gradient must be effective to prevent formation of fiber that is too soft. Therefore, the temperature must not be too high within the cooling chamber 33 to prevent adequate cooling of the fibrous material. On the other hand, the temperature of the atmosphere within the cooling chamber 33 must not be too low to prevent the formation of brittle fibers. Another contributing factor is the prevention of thermal shock to the fiberized material as it passes into the cooling chamber 33. It is imperative that all of the streamers of slag or other molten material will form completely into fiber. This can be done only through the use of temperature conditions best suited for the particular material being fiberized.

While the fiberizing unit 14 and the operation of the settling chamber 43 are being prepared for subsequent operation, the cupola 10 is charged and fired up with the material to be treated. Once the material is molten within the cupola and it is ready to be tapped, the pressurized fluid material such as steam or air is turned on in the blowing assembly 17. The control dampers 31 are opened just enough to prevent a dead or quiet condition to exist in the air space 30 behind and below the fiberizing jet openings 21. During this initial stage of operation, a low pressure area or partial vacuum has been formed above the blowing assembly 17 due to the pressurized fluid flowing through the fiberizing jet openings 21. In addition, an upwardly directed draft of air from the outside atmosphere passes up through the air space 30 toward the fans 54 located in the settling chamber 43. The pressure of the fluid medium being ejected from the fiberizing jet openings 21 is set in a range of about 90 to 100 p.s.i. in this specific embodiment. However, it is emphasized that some slags or molten material may require as much as 200 p.s.i. of pressure to be used in the operation of the fiberizing jet openings 21. Here again, the pressure being used is dependent upon the molten material being treated within the fiberizing unit 14.

The cupola 10 is tapped and the molten slag flows through the trough 11 into the basin portion 25. As the flow of molten slag continues, the supply bath within the basin portion 25 will seek its natural level. That is, the molten slag flows uniformly from the center of the basin 25 to the peripheral rim 22. The low pressure or partial vacuum that has been formed immediately above the blowing assembly 17 causes the molten slag to rapidly level out and eliminates any turbulence caused by the slag stream falling into the supply bath. Any factor which might tend to eliminate any turbulence within the supply bath is taken into account during the operation of the fiberizing unit 14. Obviously, too much turbulence in the bath will cause large amounts of the molten slag to splash over the edge of the basin. For instance, the molten slag may be falling a distance of 1'' or less from the end of the trough 11 to the supply bath thereby causing a minimum amount of turbulence. In other words, the basin 25 holds a quiescent supply bath of molten material and means is provided for supplying molten material to the bath while maintaining the quiescent state thereof.

When the level of the molten slag reaches the outer edge 22 of the basin 25, a featheredge of molten material is formed. That is, a very thin layer of the molten slag comes into contact with the pressurized fluid medium which is being ejected from the fiberizing jet openings 21. The jets of superheated fluid medium pick the molten material up with sufficient force from the featheredge to throw it into the controlled atmosphere above the supply bath where it is formed into streamers. The molten slag travels from about 6 to about 10 feet before it is completely fiberized. Therefore, the temperature of the atmosphere within the fiberizing unit 14 immediately above the slag is held just slightly lower than the temperature of the molten slag within the supply bath. That is, heating means such as the burners 16 maintain the molten condition of the material in the bath and the temperature in the section of the fiberizing zone adjacent the bath at an amount effective to produce completely fiberized material. The streamers are picked up in the draft caused both by the air from the open dampers 31 and the force of the fluid medium jets and carried into the controlled cooling chamber 33. Here the fibers become completely solidified under the best possible conditions.

Once the fibers have been completely formed, they are carried upwardly into the delivery chamber 39 which connects the fiberizing unit 14 to the settling chamber 43. Here the fibers are cooled to a temperature below 180° F. Air enters the cooling chamber 33 and delivery chamber 39 through the air space 30, openings 34 and manually controlled openings 41. The temperature of the atomsphere is held below 180° F. to avoid the premature curing or setting of the binder resin which is introduced through the spray jets 58. Once the fibers pass through the binder resin in this specific embodiment, they settle onto the conveyor belt 44. Here they form a bed 57 which subsequently is compressed into uniform mats or felts as explained hereinabove.

Another feature of the specific embodiment is shown in FIG. 6. The supply bath within the basin portion 25 is leveled out evenly and quickly as molten material is introduced therein with a steam vibrating unit 59 which provides vibratory movement in the blowing assembly 17. Springs 60 are located around the leveling screws 29 to provide a suspension system for the assembly 17. The flexible connection 18a allows the free movement of the unit 17 in conjunction with the vibratory motion establishment by the steam vibrator 59. It is noted that the drain plug 27 is off-center in this specific embodiment to allow the placement of the steam vibrator 59 as shown. Other variations of this specific embodiment to effect an equivalent function are clearly within the contemplation of the invention. As in the blowing assembly 17 described hereinabove, the supports 28 fixedly mount the assembly 17 within the fiberizing unit 14. The leveling screws 29 are used to maintain a level basin portion 25 so that the molten slag flows evenly into the fiberizing jet openings 21.

ADVANTAGES OF THE INVENTION

There are many advantatges and cost reducing features associated with the instant invention. There is no mechanical spinner mechanism necessary to operate the apparatus of this invention. Therefore there is a large saving in maintenance cost over the prior art methods and apparatus as discussed hereinabove. The use of this particular method and apparatus as described hereinabove provides a greater recovery of fiber from the molten material constituting the supply bath. In addition, there is a very careful control possible of the quality of the fiber with respect to its fineness, resilience and strength. The problem of having shot present in the final fiberized product is completely eliminated through the use of this invention. Finally, there is the possibility of unlimited production through the use of the method and apparatus as described in this specification.

While the method and apparatus for fiberizing molten materials has been shown and described in detail, it is obvious that this invention is not to be considered as being limited to the exact form disclosed, and that changes in detail and construction may be made therein within the scope of the invention, without departing from the spirit thereof.

I claim:

1. A method of forming fiberized material comprising the steps of:
    (a) supplying a thin section of molten material to be fiberized in a first section of a fiberizing zone,
    (b) said fiberizing zone including second and third sections which extend in a direction away from the molten material,
    (c) forming a controlled atmosphere in said second section of the fiberizing zone adjacent the molten material whereby the atmosphere in said second section is maintained at a temperature effective to allow complete formation of the molten material into fibers,
    (d) directing a flow of a gaseous fluid medium at a sufficient pressure into the thin section to forcefully transport said material as streamers into the controlled atmosphere adjacent the molten material,
    (e) providing a draft within said fiberizing zone to carry the streams in a direction away from said molten material,
    (f) maintaining a temperature gradient in the third section of the fiberizing zone whereby temperatures decrease along the length of the third section from an initial cooling temperature setting,
    (g) said initial cooling temperature setting and said temperature gradient being effective to prevent formation of fibers that are too soft at one extreme and fibers that are too brittle at another extreme while still being effective to cool the fibers of material without causing thermal shock therein,
    (h) maintaining a temperature directly adjacent the molten material effectively lower than the temperature of the molten material itself whereby the material may be completely fiberized under controlled cooling conditions, and
    (i) introducing air into the fiberizing zone at a location laterally displaced from the molten material to effect temperature control of the atmosphere therein,
    (j) said air introducing step including sensing and measuring the temperature at a location in the fiberizing zone adjacent the molten material and controlling the quantity of the surrounding atmosphere to come into the fiberizing zone and cool the atmosphere as a function of the change in temperature measured therein.

2. A method as defined in claim 1 wherein cooled fibers from the fiberizing zone are directed into a settling zone to form an accumulation thereof and the accumulated fibers are discharged to form a fiberized product.

3. A method as defined in claim 2 wherein the discharging step includes the step of compressing the accumulated fibers to form a compacted fiberized product.

4. An apparatus for forming fiberized material comprising:
(a) a fixedly mounted vessel means for maintaining a quiescent bath of molten material to be fiberized,
(b) means for supplying molten material to be the bath while maintaining the quiescent state thereof,
(c) said vessel means having an edge portion with a structural configuration for forming a section of molten material that is thin as possible along the edge of the supply bath and
(d) nozzle means disposed along the edge portion to direct a pressurized flow of gaseous fluid medium upwardly through the thin section to cause material to be forefully transported as streamers away from the vessel means and to create a partial vacuum thereabove,
(e) said nozzle means being disposed for contact with the edge of the supply bath and having outlet openings through which the pressurized flow is directed into the thin section of the supply bath.

5. An apparatus for forming fiberized material comprising:
(a) the fixedly mounted vessel means for maintaining a quiescent bath of molten material to be fiberized,
(b) said vessel means including a basin portion to contain said quiescent bath and an edge portion extending along the top of the basin portion,
(c) means for supplying molten material to the bath while maintaining the quiescent state thereof,
(d) said vessel means having a structural configuration for forming a section of molten material that is thin as possible along the edge of the supply bath, and
(e) means for directing a pressurized flow of a gaseous fluid medium along the thin section to cause material to be forefully transported as streamers away from said vessel means,
(f) said fluid medium directing means being disposed for contact with the edge of the supply bath,
(g) said fluid flow directing means including a pressurized fluid chamber located below said basin portion and means to introduce a supply of pressurized fluid medium into said pressurized fluid chamber.

6. An apparatus as defined in claim 5 wherein the vessel means includes means to vibrate said basin portion.

7. A method of forming fiberized material comprising the steps of:
(a) providing a quiescent bath of molten material to be fiberized in a fiberizing zone,
(b) forming a section that is thin as possible at the edge of said bath within the fiberizing zone,
(c) enclosing the atmosphere in the fiberizing zone around the thin section of molten material,
(d) said fiberizing zone including first and second contiguous portions which extend upwardly away from the quiescent bath,
(e) maintaining the amount of turbulence within the bath as low as possible to retain the quiescent condition of the bath in the first fiberizing portion and the temperature in the second fiberizing portion is effective to allow complete formation of the desired fibers,
(f) directing a flow of a gaseous fluid medium at a sufficient pressure upwardly into the thin section of molten material to forcefully transport said material as streamers into the enclosed atmosphere, and
(g) providing a draft within the fiberizing zone to carry the streamers in a direction away from the molten material bath.

8. A method as defined in claim 5 wherein the fluid flow directing step includes super-heating said fluid medium.

9. A method as defined in claim 7 wherein the fiberizing zone includes a third portion contiguous to the second portion and extending in a direction away from said second portion and maintaining the fiberizing zone under pressure conditions effective to cool said fiber material without causing thermal shock therein.

10. A method as defined in claim 9 wherein said temperatures in the said third fiberizing portion includes a temperature gradient having decreasing temperatures along the length of said third fiberizing portion from an initial cooling temperature setting, said initial cooling temperature setting and said temperature gradient being effective to prevent formation of fiber that is too soft at one extreme and fiber that is too brittle at another extreme.

11. A method of forming fiberized material comprising the steps of:
(a) providing a quiescent bath of molten material to be fiberized in a fiberizing zone,
(b) forming a section of molten material that is thin as possible at the edge of said bath within the fiberizing zone,
(c) enclosing the atmosphere in the fiberizing zone around the thin section of molten material,
(d) directing a flow of a gaseous fluid medium at a sufficient pressure upwardly into the thin section to forcefully transport said material as streamers into the enclosed atmosphere above the quiescent bath,
(e) heating the enclosed atmosphere in said fiberizing zone adjacent the molten material to maintain the temperature throughout the fiberizing cycle whereby fibers of said material are completely formed,
(f) introducing a second gaseous fluid medium into the fiberizing zone above the quiescent bath to effect temperature control of the atmosphere therein, and
(g) providing a draft within said fiberizing zone to carry the streamers in a direction away from said molten material.

12. A method as defined in claim 11 wherein the second fluid medium is air and said air introducing step includes sensing and measuring the temperature at a location in the fiberizing zone above the molten material and controlling the quantity of the surrounding atmosphere to come into the fiberizing zone and cool the atmosphere as a function of the change in temperature measured therein.

13. A method as defined in claim 11 including directing the cooled fibers from the fiberizing zone into a settling zone to form an accumulation thereof and discharging the accumulated fibers to form a fiberized product.

14. A method as defined in claim 13 wherein said discharging step includes the step of compressing, said accumulated fibers to form a compacted fiberized product.

15. An apparatus for producing fiberized material products comprising:
(a) a vessel to hold a supply bath of said molten material,
(b) said vessel being fixedly mounted at the bottom of a vertically extending housing which forms a fiberizing chamber,
(c) said housing including a furnace portion and a fiber cooling portion,
(d) said furnace portion including burner means to maintain a molten condition in the supply bath,
(e) said vessel having a structural configuration to form a section of the molten material that is thin as possible along the edge of the supply bath,
(f) means for directing a pressurized flow of a gaseous fluid medium upwardly through the thin molten material edge section to cause said molten material to be forcefully transported as streamers above the vessel, (g) said fluid flow directing means including nozzle means connected along an edge portion of the vessel, (h) said nozzle means including outlet openings being contiguous to the edge of the vessel and through which openings the pressurized flow is directed upwardly into the thin edge section of molten material, and (i) means providing an upwardly directed draft within the fiberizing chamber to carry the streamers of molten material upwardly through the vertically extending housing.

16. An apparatus as defined in claim 15 wherein said fiber cooling portion includes means to open and close apertures located in the housing above the furnace portion.

17. An apparatus as defined in claim 15 wherein said housing includes apertures located along the length thereof, and said draft providing means includes means to open and close apertures located at the bottom of said housing and juxtaposed said vessel.

18. An apparatus as defined in claim 15 wherein said housing includes apertures located along the fiberizing chamber, a duct means is connected to the vertically extending housing to contain a flow of fiberized material from said fiber cooling portion to a settling chamber.

said draft providing means includes blower means connected to said setting chamber to effect said draft from the apertures in said fiberizing chamber through said duct means into said settling chamber and draft discharge means to exhaust gas from said settling chamber.

19. An apparatus as defined in claim 18 wherein nozzle means is located in said settling chamber to introduce binder material to said fibers and pressing means is located at a fiber discharge outlet to compress fiber material into a compact product.

20. An apparatus as defined in claim 15 wherein spout means extends from a source outside said fiberizing chamber over said vessel to convey molten material to the supply bath.

21. An apparatus as defined in claim 20 wherein a section of said edge portion located underneath said spout member has a solid construction and includes a boss member extending upwardly from said edge portion.

References Cited

UNITED STATES PATENTS

| | | | |
|---|---|---|---|
| 2,317,895 | 4/1943 | Drill | 65—9 X |
| 2,403,740 | 7/1946 | Muench | 65—10 |
| 2,569,472 | 10/1951 | Hommel | 65—9 X |
| 3,323,887 | 6/1967 | Downey | 65—6 X |
| 3,336,125 | 8/1967 | Schachter. | |
| 2,156,316 | 5/1939 | Slayter et al. | 65—16 |
| 2,235,352 | 3/1941 | Bates | 65—16 X |
| 2,554,486 | 5/1951 | Austin | 65—16 X |
| 2,814,832 | 12/1957 | Stephens | 65—5 |

S. LEON BASHORE, Primary Examiner

R. L. LINDSAY, Assistant Examiner

U.S. Cl. X.R.

18—8 A, 8 G; 65—16; 264—12